Aug. 16, 1955 H. M. JAMES 2,715,274
COMPOUND RESOLVER COMPUTER
Filed Sept. 18, 1945 4 Sheets-Sheet 1

Fig. 1

INVENTOR.
Hubert M. James

Aug. 16, 1955  H. M. JAMES  2,715,274
COMPOUND RESOLVER COMPUTER
Filed Sept. 18, 1945  4 Sheets-Sheet 2

INVENTOR
HUBERT M. JAMES

BY Ralph L Chappell
ATTORNEY

Aug. 16, 1955    H. M. JAMES    2,715,274
COMPOUND RESOLVER COMPUTER
Filed Sept. 18, 1945    4 Sheets-Sheet 3

INVENTOR
HUBERT M. JAMES
BY Ralph L Chappell
ATTORNEY

Aug. 16, 1955    H. M. JAMES    2,715,274
COMPOUND RESOLVER COMPUTER
Filed Sept. 18, 1945    4 Sheets-Sheet 4

INVENTOR
HUBERT M. JAMES
BY Ralph L Chappell
ATTORNEY

United States Patent Office 2,715,274
Patented Aug. 16, 1955

2,715,274

COMPOUND RESOLVER COMPUTER

Hubert M. James, Belmont, Mass., assignor, by mesne assignments, to the United States of America as represented by the Secretary of the Navy Application September 18, 1945, Serial No. 617,144

20 Claims. (Cl. 33—49)

This invention relates to apparatus for accurately and rapidly furnishing the angular position of an object with reference to a first set of coordinate axes when the angular position of the object with reference to a second set of coordinate axes with the same origin is known. The only additional information required is the angular relationships between the first and second coordinate systems. Conversely, these angular relationships between the first and second coordinate systems may be determined when the angular positions of some reference object with respect to the two coordinate systems are known.

It is an object of this invention to provide apparatus for accurately and rapidly furnishing the angular position of an object with reference to a first coordinate system when the angular position of the object with reference to a second coordinate system and the angular relationships between the first and second coordinate systems are known, or conversely furnish the angular relationships between the first and second coordinate systems when the angular positions of some reference object with respect to these first and second coordinate systems are known.

It is a further object of this invention to provide apparatus which furnishes accurately and rapidly the deck train and trunnion order to a gun, searchlight, spinner, or similar directive device from the relative true bearing and elevation of a target as found by a stabilized director.

It is a further object of this invention to provide apparatus which furnishes accurately and rapidly the relative true bearing and elevation of a target with reference to a stabilized horizontal plane from the deck train and trunnion order of a directive device.

It is a further object of this invention to provide apparatus which furnishes accurately and rapidly exact solutions of practical problems in spherical trigonometry, including the solution for one or more of the following angular quantities in terms of other known angles: roll, pitch, deck tilt angle, level, cross-level, true relative target bearing, train order, director train (stabilized), deck tilt correction, true target elevation angle, elevation order, and cross traverse angle.

It is a further object of this invention to provide apparatus which furnishes accurately and rapidly the deck train order to a gun, searchlight, spinner, or similar directive device from the relative true bearing of a target as found by a stabilized director, or the relative true bearing from the deck train order.

It is a further object of this invention to provide apparatus which furnishes accurately and rapidly the level and cross level angles, when the pitch, roll, and deck train are known.

It is a further object of this invention to provide methods of testing the above apparatus to maintain accurate operation.

Other and further objects will appear during the course of the following description together with the accompanying drawing where.

On shipboard the laying of guns, searchlights, antennas and similar devices on targets is complicated by the rolling and pitching of the ship. The lighter devices such as antennas may be stabilized by suitable gyroscopes, but this stabilization is not feasible in the case of heavier devices such as guns. With a stabilized director the target data will be obtained with reference to a stabilized horizontal plane. The bearing $Br$ of the target will be with reference to the course of the ship and is known as the true relative bearing, and the elevation E will be with reference to this stabilized plane. This data must be rapidly converted to a deck train $B'r$ and trunnion elevator $E'g$ order, since unstabilized devices must be laid with reference to the ship itself. Devices which furnished an approximate solution to this conversion problem are known in the art. These devices have the disadvantage of requiring corrections to be applied to the solution obtained. The apparatus of the present invention gives directly an exact solution.

To avoid confusion with the use of the symbol E which has been employed to designate voltages with reference to Fig. 1A, elevation angles will hereinafter be designated by the symbol $\beta$ for true elevation angle and $\beta'$ for elevation order and to avoid further confusion the symbol $\alpha$ will hereinafter designate true bearing and $\alpha'$ train order.

Figure 1:
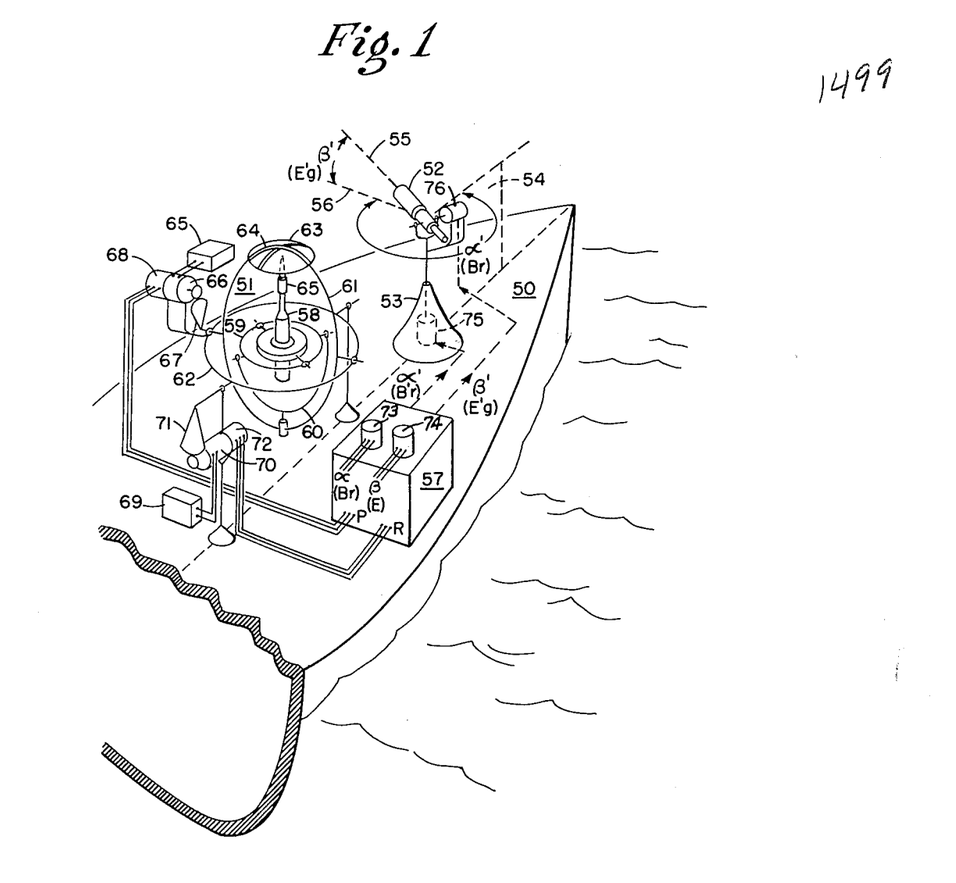
Fig. 1 is a schematic perspective view of a portion of a ship's hull fitted with a stable element, a directed device, and a computer for directing the device.

Referring to Fig. 1, there is depicted the deck 50 of a ship upon which are mounted a universally suspended gyroscope 51 for continuously measuring the roll (R) and pitch (P) angles of the ship and a directed device 52, which is represented as a telescope, universally pivotally supported on a pedestal 53 fixed to the deck and aligned with the fore-and-aft axis of the ship.

It is well known that the angle $\alpha'$, which is the angle between the vertical plane 54 through the fore-and-aft axis of the ship and the vertical plane through the telescope line of sight 55, measured in the deck plane, changes virtually continually due to the unstable motion of the ship or platform upon which the directed device is mounted. Similarly, the angle $\beta'$, the elevation order angle, which is the angle between the line of sight 55 and an axis 56 parallel to the deck measured in a plane perpendicular to the deck containing the line of sight, changes nearly continually due to the unstable motion of the deck 50. These changes are continuously calculated by the computer 57, when the desired location of the line of sight 55 is supplied thereto in reference to a stable reference plane (by the angles $\alpha$ and $\beta$) and the roll angle R and pitch angle P are continuously fed to the computer 57, the latter two quantities being continuously fed into the computer by the stable element 51.

The construction and operation of a stable element for measuring the roll and pitch angles is well known in the art and the following description exemplifies a well known device. A vertical gyroscope 58 is universally supported in a power driven gimbal system including gimbal ring 59 pivoted on gimbal ring 60 journalled about a vertical axis on vertical frame 61 which in turn is pivoted on horizontal frame 62, and the horizontal frame is pivoted about an axis coincident with the fore-and-aft vertical plane. Mounted on vertical frame 61 is a follow-up induction coil 63 whose axis lies in the fore-and-aft direction and which detects ship's roll. A similar follow-up induction coil 64 is mounted on vertical frame 61 and arranged with its axis transverse to coil 63 for detecting pitch of the ship.

An electromagnet 65 is mounted coaxially with the spin axis of the gyroscope 58 so that it induces currents in follow-up coils 63 and 64 when there is relative movement between the coils and the spin axis. Follow-up coil 63 analyzes relative movement due to roll of the ship and the currents induced therein are amplified at 65 and used to control follow-up motor 66 which returns frame 61 to its initial vertical position by the torque exerted through sector gear 67. A conventional electrical position transmitter 68, such as the "Selsyn," produces signals in its output cable which are used to produce mechanical rotation (P) of the rotor of one of the resolvers in the computer. In a similar manner follow-up coil 64 analyzes relative movement due to pitch of the ship and currents induced therein are amplified at 69 and fed to follow-up motor 70 which returns frame 62 to its initial horizontal position by the torque exerted through sector gear 71. An electrical position transmitter 72 is thus caused to produce signals in its output cable which are utilized to cause mechanical rotation (R) of the rotor of another of the resolvers in the computer.

The desired position angles $\alpha$ and $\beta$ supplied by automatic means not shown, are continuously fed into computor 57 by position receivers 73 and 74. The computor 57 utilizes the four input values to calculate $\alpha'$ and $\beta'$ and these two output values are used to lay guns or direct other apparatus which operate upon a remote object, such as a target. For example, in Fig. 1, train order $\alpha'$ output is applied to motor 75 and elevation order $\beta'$ output is applied to motor 76 whereby the telescope 52 is aimed at a remote object.

Figure 1A:
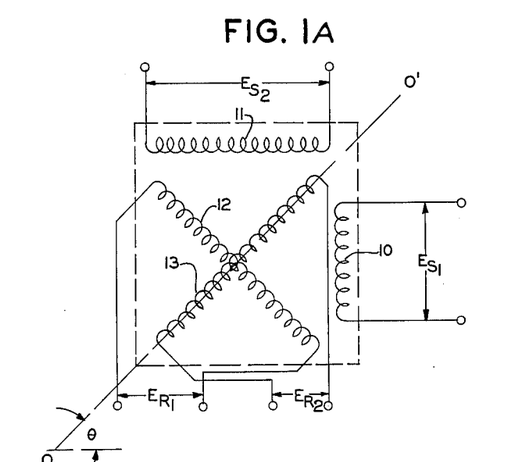
Fig. 1A is a circuit diagram of a conventional resolver.

In Fig. 1A is disclosed a device which may be used to give an approximation to the correct solution, and is known as a resolver. This device will, however, be first described in connection with its normal use. This is necessary in order to show how it may be used to give an approximation to the correct solution, and since this resolver is a component of the apparatus of this invention. The resolver is essentially a two-phase differential selsyn, i. e. a two-phase transformer with rotatable secondaries or rotor and a one to one ratio between primary and secondary. As shown the rotor 12, 13 is rotatable about an axis perpendicular to the plane of the paper. Let rotor 12, 13 be rotated to a position where axis line O–O' is at an angle $\theta$ with respect to the horizontal, and let R. M. S. voltages $Es_1$ and $Es_2$ be applied to stator coils 10 and 11 respectively. The R. M. S. voltage outputs of rotor coils 12 and 13, and designated $Er_1$ and $Er_2$ respectively, will be $$Er_1 = Es_1 \cos \theta + Es_2 \sin \theta \quad (1)$$
$$Er_2 = -Es_1 \sin \theta + Es_2 \cos \theta$$

If a vector has coordinates $(x, y, z)$ in a right hand system of coordinates A, its coordinates $(x', y', z')$ in the system A' obtained by rotating system A about the Z axis through angle $\theta$, will be:

$$x' = x \cos \theta + y \sin \theta$$
$$y' = -x \sin \theta + y \cos \theta \quad (2)$$
$$z' = z$$

On comparison the equivalence of Equations 1 and 2 will be apparent. In effect the resolver of Fig. 1 electrically performs the same function as a rotation of axes in space. The resolver is thus adapted to take two electrical inputs representing components of a vector in a system of rectangular coordinates and also a mechanical input in the nature of an angular rotation. From these inputs the resolver provides two electrical outputs corresponding to components of the original vector in a new set of rectangular coordinates rotated through the angle given by the mechanical input.

Although this resolver was intended to provide transformation of coordinates only for cases of simple rotation of the coordinate system about one of the three mutually perpendicular axes, it has been proposed to use this apparatus for making approximate computations of angular relations in other cases. Schemes were proposed for using this resolver to change pitch and roll into approximate values for level and cross level to be used in making the necessary correction in the laying of guns. The errors in such a procedure increase rapidly with the roll and pitch of a ship, being roughly variable with the cube of the roll and pitch.

The present invention avoids the necessity of working with unsatisfactory approximations and then attempting to work out correcting arrangements for them. It provides instead an exact solution of such problems by employing a series of these resolvers, each one operating under the conditions for which it was designed, which is to say to provide a transformation about one of the three mutually perpendicular axes. The arrangements of the present invention requires the use of a substantial number of resolver units operating in tandem.

Figure 2:
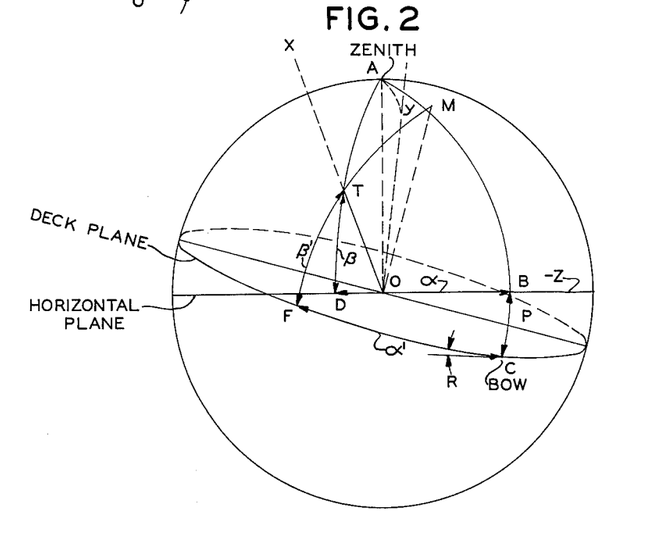
Fig. 2 is a diagram useful in explaining the operation of the invention.
Figure 3:
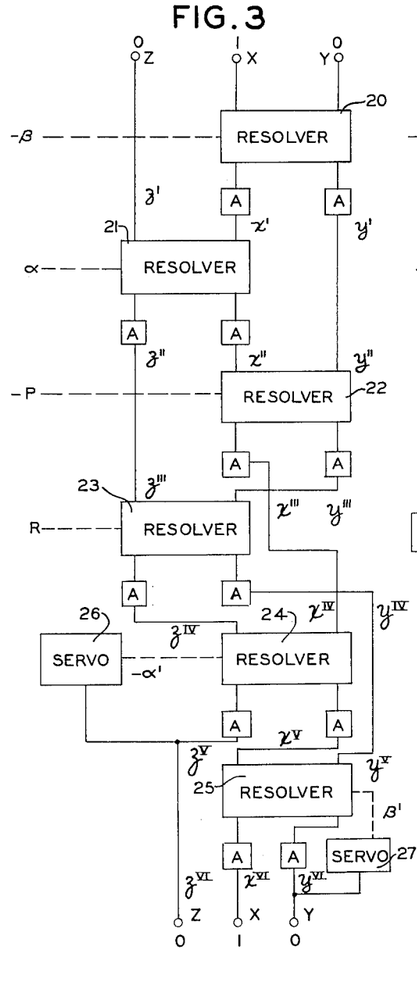
Figs. 3, 4, and 5 are block diagrams of respective embodiments of the invention.

Referring now to Fig. 2, where there is disclosed a diagram of the various angles to be dealt with by the embodiment in Fig. 3. The circle with center O in which the diagram is inscribed is a unit circle in the vertical plane. The horizontal diameter of this circle is the projection of a corresponding circle in the horizontal plane. The plane of this last mentioned circle is the previously mentioned stabilized horizontal plane. These two circles determine a spherical surface. A ship is considered to be located at center O. The line OT represents the line of sight from the ship to a target. Point T is on the surface of the spherical surface determined by the two circles, but the target is not necessarily on this surface. A vertical plane through the fore and-aft axis of the ship will intersect the unit sphere in a great circle, of which the arc ABC is shown. The length of the arc BC from the horizontal plane to the point of intersection of the fore-and-aft axis is equal to the pitch angle P, since the sphere is a unit sphere. The roll angle R is the angle between the perpendicular to arc BC at point C and the arc in which the deck plane intersects the unit sphere. A vertical plane including the origin and the point T will intersect the unit sphere in a great circle of which ATD is an arc. DT has a length equal to the true elevation angle $\beta$ of the target, and BD a length equal to its true relative bearing $\alpha$. A plane passed through the points O and T, and normal to the deck plane, will intersect the unit sphere in a great circle of which MTF is an arc. FT has a length equal to the elevation order $\beta'$ of the target, while CF has a length $\alpha'$ equal to the train order of the target. All of the angles P, R, $\alpha$, $\alpha'$, $\beta$, $\beta'$ will be taken to have positive signs as shown in Fig. 2.

Let is be desired to determine $\alpha'$ and $\beta'$, given $\alpha$, $\beta$, R, and P. These quantities are related to a sequence of six rotations of a coordinate system, each of which will change the coordinates of an arbitrary vector in a way which can be computed using a single resolver. Let the original $x$ axis lie along the line OT, the $y$ axis in the same vertical plane, intersecting the unit circle at a point beyond the zenith, while the $z$ axis is horizontal. In Fig. 2 it is more convenient to show the intersection of the $-z$ axis with the unit sphere than that of the $z$ axis, which intersects the rear hemisphere. Now let the $x$ and $y$ axes be rotated about the $z$ axis through the angle $\beta$, until the $x$ axis is horizontal (OD), the $y$ axis vertical (OA). About this new $y$ axis rotate the coordinate system through the angle $\alpha$, until the $x$ axis has the direction of the ship's heading, OB. Next, rotate the $x$ and $y$ axes about the horizontal $z$ axis through the angle P, until the $x$ axis coincides with the ship's fore-and-aft axis OC. Next rotate the $z$ and $y$ axes about the $x$ axis through the angle R, until the $z$ axis lies in the deck plane and the $y$ axis coincides with the normal OM to the deck plane. All these rotations of axes correspond to known angles in the problem. The $x$ axis of this coordinate system (OC) may now be returned to its original direction by two rotations corresponding to the unknown quantities $\alpha'$ and $\beta'$. The first of these, about the $y$ axis (OM) through an angle $\alpha'$, brings the $x$ axis to the line OF, while the second, about the $z$ axis through an angle $\beta'$, brings the $x$ axis back to the line OT. This may be made the basis of a computing system. The known values of $\beta$, $\alpha$, P, and R are fed into the computer, which in turn computes the components in each coordinate system of a reference vector having the direction OT. Finally, by follow-up systems there are introduced the desired rotations $\alpha'$ and $\beta'$ of the coordinate system required to reduce the $y$ and $z$ components of the vector OT to zero, and thus to bring the $x$ axis into the direction of OT. These follow-up systems will continually generate the appropriate values of $\alpha'$ and $\beta'$ as $\alpha$, $\beta$, P and R vary with motion of the target and of the ship.

A system known as a two axis computer which performs the above described transformations is disclosed in block form in Fig. 3, and will now be described in connection with the diagram in Fig. 2. The large blocks indicate each a resolver similar to that disclosed in Fig. 1A. The small blocks A indicate each a booster amplifier, and are used simply to compensate for losses that may occur in the immediately preceding resolver and to provide a high impedance load at the output of each resolver. With the amplifier properly adjusted, the amplifier outputs will be related to the electrical and mechanical inputs to the immediately preceding resolver by equations of the form of Equation 1.

It will be remembered from the preceding description of the principle of the computer that the line of sight OT was both the direction of the initial $x$ axis and of the fixed reference vector. The $y$ and $z$ components of that vector have thus magnitude zero. The magnitude of the vector has no importance for the problem. In the equations which follow this magnitude is taken as unity; the components of the reference vector in the initial coordinate system are thus $$x=1$$
$$y=0 \quad (3)$$
$$z=0$$

These are represented by electrical inputs to the computer of magnitudes 1 (in arbitrary units), 0, and 0, respectively.

As already described, this original $x$, $y$, $z$ coordinate system is to be carried into a second $x'$, $y'$, $z'$ coordinate system by rotation about the $z$ axis, through an angle $\beta$ from the $y$ axis toward the $x$ axis, or through $-\beta$ from the $x$ axis toward the $y$ axis. The components of the reference vector in this new coordinate system are computed by the resolver 20 at the top of Fig. 3, the $z$ component being unchanged, the $x$ and $y$ components changed according to Equation 1. Components of the reference vector in this new coordinate system are then $$x'=\cos \beta$$
$$y'=\sin \beta \quad (4)$$
$$z'=0$$

It may be noted that resolver 20 could very simply be replaced by a pair of sinusoidal potentiometers or condensers driven in accordance with the angle $-\beta$, the choice depending on whether a sinusoidal potentiometer or condenser is more readily obtainable than an additional resolver. Substitutions of this type are easier where the inputs or the outputs are equal to unity and zero, since this cuts down by half the number of potentiometers or condensers required in the substitute apparatus. For the other resolvers of the system, the type disclosed in Fig. 1A is the most practicable type of unit to use.

Next the $x'$, $y'$, $z'$ coordinate system is to be rotated into the $x''$, $y''$, $z''$ coordinate system by a rotation about the $y'$ axis, through an angle $\alpha$ from the $z'$ axis toward the $x'$ axis. The $y$ component of the reference vector is unchanged, while the transformation of the $x'$, $z'$ components into the $x''$, $z''$ components is accomplished by resolver 21 of Fig. 3. Again applying Equation 1, one finds $$x''=\cos \beta \cos \alpha$$
$$y''=\sin \beta \quad (5)$$
$$z''=\cos \beta \sin \alpha$$

The third rotation of the coordinate system, carrying the $x''$, $y''$, $z''$ axes into the line $x'''$, $y'''$, $z'''$ axes, involves a rotation about the $z''$ axis through an angle $-P$ from the $x''$ axis toward the $y''$ axis. Resolver 22 of Fig. 3 accomplishes the corresponding transformation of the components of the reference vector. At this stage in the computer the voltages produced are $$x'''=\cos \beta \cos \alpha \cos P - \sin \beta \sin P$$
$$y'''=\cos \beta \cos \alpha \sin P + \sin \beta \cos P \quad (6)$$
$$z'''=\cos \beta \sin \alpha$$

The fourth rotation of the coordinate system is a rotation about the $x'''$ axis through an angle R from the $z'''$ axis toward the $y'''$ axis. Resolver 23 of Fig. 3 correspondingly transforms the components of the reference vector, producing the voltages $$x^{IV}=\cos \beta \cos \alpha \cos P - \sin \beta \sin P$$
$$y^{IV}=-\cos \beta \sin \alpha \sin R +$$
$$\quad [\cos \beta \cos \alpha \sin P + \sin \beta \cos P] \cos R \quad (7)$$
$$z^{IV}=\cos \beta \sin \alpha \cos R +$$
$$\quad [\cos \beta \cos \alpha \sin P + \sin \beta \cos P] \sin R$$

These are components of the reference vector in a coordinate system fixed in the ship, the $x^{IV}$ and $z^{IV}$ axes lying in the deck plane with the $x^{IV}$ axis pointing forward, and the $y^{IV}$ axis directed generally upward, normal to the deck. Their computation completes the utilization of the known angles $\alpha$, $\beta$, P, R of the problem.

The first of the unknown angles to be determined is $\alpha'$. This is the angle through which the coordinate system must be rotated about the $y^{IV}$ axis from the $x^{IV}$ axis toward the $z^{IV}$ axis, in order to bring the reference vector into the $x^V$, $y^V$ plane, or to make the $z^V$ component of the reference vector vanish. Transformation of the components of the reference vector from the $x^{IV}$, $y^{IV}$, $z^{IV}$ coordinate system to another system rotated about the $y^{IV}$ axis is accomplished by resolver 24 of Fig. 3. A servo mechanism 26 which controls the $z^V$ output of this resolver, by rotating the mechanical angular input, and maintains this output as the desired value 0, will thereby continually rotate the resolver input shaft through the train order angle $-\alpha'$ which it is desired to know. The servo may be a small unit acting only as part of the computer, providing information to mechanisms controlling other equipment, or it may actually be the servo mechanism which also serves to rotate a spinner, gun, or director sight through the required angle $\alpha'$. A suitable servo mechanism may comprise a parallel T filter whose input is connected to $z^V$ and whose output feeds an amplifier with phase shifter. The amplifier output will be two phase, and is used to drive a two phase motor. This motor is utilized to rotate resolver 24 through the required angle $\alpha'$.

The outputs of resolver 24 are $$x^V=x^{IV} \cos \alpha' + z^{IV} \sin \alpha' \quad (8)$$
$$z^V=z^{IV} \cos \alpha' - x^{IV} \sin \alpha' = 0$$

From the second of these equations it is evident that the computer has in effect obtained $\alpha'$ by solving $$\tan \alpha' = \frac{z^{IV}}{x^{IV}} \quad (9)$$

or $$\alpha' = \tan^{-1} \left\{ \frac{\cos \beta \sin \alpha \cos R + [\cos \beta \cos \alpha \sin P + \sin \beta \cos P] \sin R}{\cos \beta \cos \alpha \cos P - \sin \beta \sin P} \right\} \quad (10)$$

Squaring the two Equations 8 and adding, one has $$(x^V)^2 = (x^V)^2 + (z^V)^2 = (x^{IV})^2 + (z^{IV})^2 = 1 - (y^{IV})^2 \quad (11)$$

Resolver 25 of Fig. 3 is thus provided with inputs $$x^V = \{1 - (y^{IV})^2\}^{1/2} \quad (12)$$
$$y^V = y^{IV}$$

As the final step in the calculations, the coordinate system is rotated about the $z^V$ axis until the new $x^{VI}$ axis lies along the reference vector, and the $y^{VI}$ component of that vector is zero. Resolver 25 transforms the components of the reference vector from the $x^V$, $y^V$, $z^V$ coordinate system to another system rotated about the $z^V$ axis. The servo 27 of Fig. 3 maintains the output $y^{VI}$ as the desired value, 0, by rotating the mechanical angular input to this resolver. Thereby it continually maintains this angular input at the value of the elevation order $\beta'$, which it is desired to compute. As in the case of the servo 26, this angular output may be provided to a data transmission system, or the servo in question may at the same time control the devices which it is desired to rotate through the computed angle $\beta^1$. The outputs of resolver are $$x^{VI} = x^V \cos \beta' + y^V \sin \beta' = 1 \quad (13)$$
$$y^{VI} = -x^V \sin \beta' + y^V \cos \beta' = 0$$

The computer has thus in effect obtained $\beta'$ by solving $$\tan \beta' = \frac{y^V}{x^V} = \frac{y^V}{\{1-(y^V)^2\}^{1/2}} \quad (14)$$

or $$\beta' = \sin^{-1} y^V = \sin^{-1} y^{IV} \quad (15)$$

that is, $$\beta' = \sin^{-1}\{-\cos \beta \sin \alpha \sin R + [\cos \beta \cos \alpha \sin P + \sin \beta \cos P] \cos R\} \quad (16)$$

If the system is to be used for the purpose of controlling $\beta'$ indicator circuits instead of controlling a device to be directed such as a gun, searchlight, or spinner, the electrical outputs $y^V = \sin \beta'$ and $x^V = \cos \beta'$ may be used directly without inclusion in the computer of resolver 25 or servo 27, just as use of the first resolver can be avoided by the use of electrical inputs corresponding to the sine and cosine of the first angle.

It may be emphasized that computers of the type here considered can be designed, using the reference vector idea, by inspection of diagrams such as Fig. 2, without need for any mathematical analysis. Indeed, the best method for finding the simplest possible relations between the angles in such problems is to design such a computer and trace through the steps in its operation, as is done here. The standard methods of spherical trigonometry often lead to very much more complex and intractible results.

Figure 4:
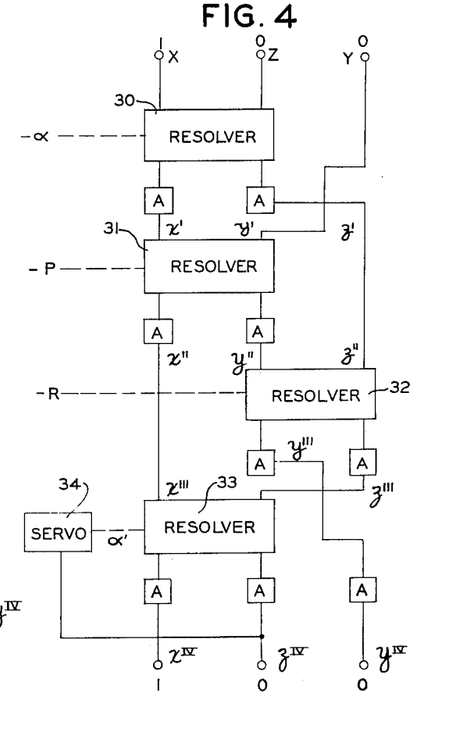

The embodiment disclosed in Fig. 4 provides an output of train angle and is known as a deck tilt corrector. It uses two less resolvers than the embodiment previously disclosed. From a given true relative bearing of an object, that is a relative bearing with respect to the course of the ship measured in a horizontal plane, and given roll and pitch values, the train order or relative bearing in the deck plane may be computed. Initially a stabilized coordinate system is chosen having the $x$ and $z$ axes in the horizontal plane with the $x$ axis having the horizontal direction of the line of sight, that is the $x$ axis extends horizontally in the direction of the object. The reference vector lies also along the horizontal line of sight.

Resolver 30 rotates the $x$ and $z$ axes in the horizontal plane about the vertical $y$ axis through an angle $-\alpha$, until the $x$ axis lies along the course of the ship. Resolvers 31 and 32 perform the necessary transformation for pitch and roll as in the preceding embodiment, computing components of the reference vector in a coordinate system fixed in the ship. The final transformation is accomplished by resolver 33 and the associated servo 34.

This resolver rotates the coordinate system about the $y'''$ axis until the $x'''$ axis lies in the plane perpendicular to the deck plane and including the line of sight. $z^{IV}$ is then zero. The amount of rotation necessary is the train order $\alpha'$ for this problem, which differs from that dealt with in the preceding embodiment in that the elevation of the line of sight, $\beta$, is zero.

Figure 5:
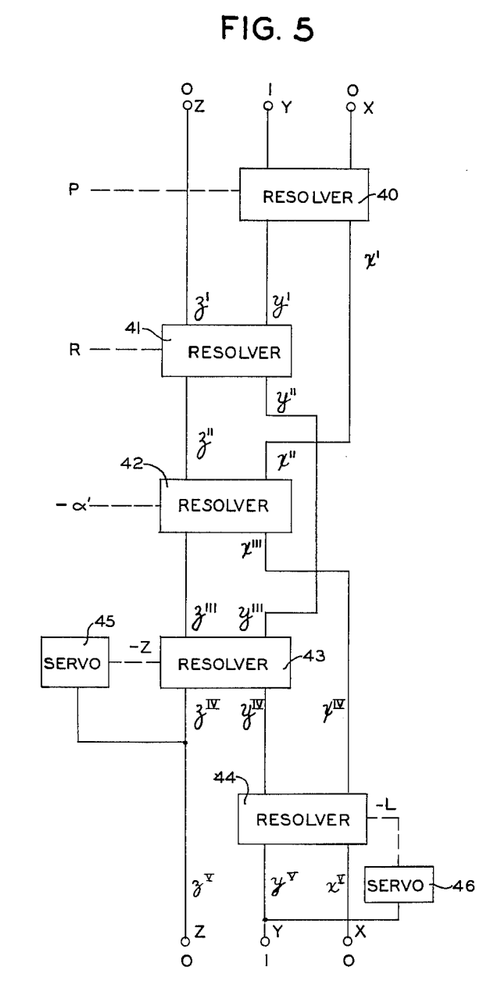

The embodiment disclosed in Fig. 5 is known as a level-cross level converter. This system gives the level and cross-level angles, when the pitch, roll, and deck train are known. Here the level angle is defined as the angle between the plane of the ship's deck and the true horizontal plane, measured in a vertical plane including the line of sight to the target. This quantity is positive if the side of the level angle lying in the ship's deck lies below the horizontal side of that angle. Cross level angle is defined as the angle between the plane of the ship's deck and the true horizontal plane, measured in the plane perpendicular to the side of the level angle lying in the ship's deck. This quantity is positive if the right side of the deck, with respect to an observer on the ship and looking along the line of sight, is raised. It is to be noted that the booster amplifiers A of previous embodiments have been omitted here. This is solely for simplification. The existence of these amplifiers in this embodiment as in previous embodiments is to be understood.

Initially the $x$ and $z$ axes of the coordinate system are taken to be in the horizontal plane, the $x$ axis having the direction of the ship's course, and the $y$ axis being vertical. The reference vector will also be vertical, having initially components (0, 1, 0). Successive rotations of the coordinate systems, about the $z$ axis through an angle P from the $y$ axis toward the $x$ axis, and about the $x'$ axis (the $x$ axis in its new position), through an angle R from the $z'$ axis toward the $y'$ axis, will bring the $x''$ and $z''$ axes into the deck plane. The resolvers 40 and 41 of Fig. 5 carry out the corresponding transformations of components. The third rotation is about the $y''$ axis, through the deck train angle $-\alpha'$ from the $x''$ axis toward the $z''$ axis, the $x''$ and $z''$ axes remaining in the deck plane; the transformation is made by resolver 42. The desired cross level angle is now the rotation about the $x'''$ axis, from the $y'''$ axis toward the $z'''$ axis, required to bring the $x'''y'''$ plane into coincidence with a vertical plane, that is, to make the new $z$ axis horizontal and the component $z^{IV}$ of the vertical reference vector vanish. Resolver 43 of Fig. 5 carries out the transformation of components to the rotated reference system, while the servo 45 maintains the component $z^{IV}$ at the desired value 0, thereby maintaining the mechanical angular input to revolver 43 at the desired value $-Z$. Finally, it will be noted that rotation of the coordinate system about the $z^{IV}$ axis, through the angle L from the $x^{IV}$ axis toward the $y^{IV}$ axis, will make the $x$ axis horizontal and the component $x^V$ of the vertical reference vector vanish. Resolver 44 of Fig. 5 carries out the corresponding transformation of components, while the servo 46 maintains the $x^V$ component at the desired value, thereby maintaining the angular input of resolver 44 at the desired value $-L$.

It may be necessary to check the gain in the booster amplifiers from time to time. A satisfactory checking procedure will involve:

(1) A minimum number of adjustments.
(2) Independent adjustments of the several amplifiers.
(3) Adjustments to nulls, for maximum sensitivity to deviations.
(4) Minimum sensitivity to errors in setting up for the tests.

In such an electrical device as that here considered the existence of a satisfactory checking procedure is a matter of great importance. The disclosed design permits simple checks on satisfactory operations.

The voltage level at which the various resolvers operate is not a matter of great importance, and this level may be allowed to vary from time to time. It is important, however, that the two inputs to any given resolver be in the proper ratio, and in the same phase. Unbalanced booster action must not exist to introduce effective rotations of the coordinate system.

Figure 6:
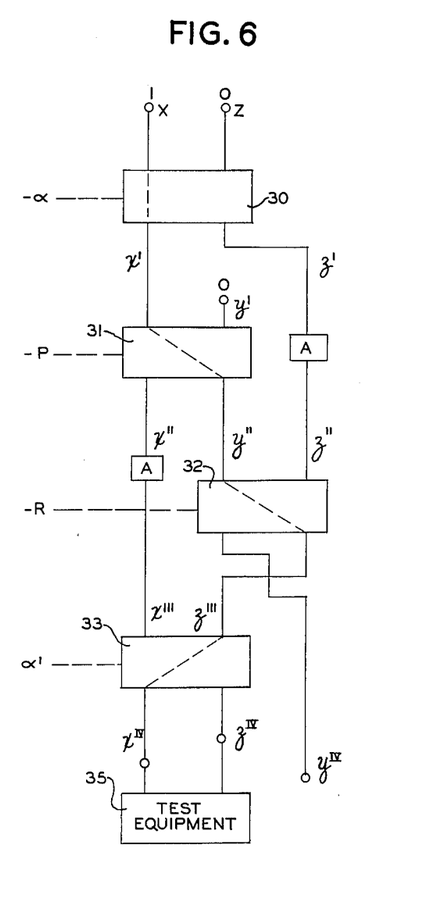
Fig. 6 is a simplified block diagram of the embodiment of Fig. 4.

As an example of the checking procedure, it will be applied in detail to the deck tilt corrector of Fig. 4, which is reproduced with some simplifications and additions as Fig. 6. In this figure there are indicated only two of the booster amplifiers, which will be referred to as the $z'$ and $x''$ boosters, respectively.

First of all, there exists one route through the system which passes through every resolver. This will be called the basic route. It is indicated in Fig. 6 by the addition of dashed lines through the resolvers. It passes through the $x$, $x'$, $y''$, $z'''$ and $x^{IV}$ connections and the corresponding boosters. It is unnecessary to control the boosters on this route; they may be permitted to fix the voltage levels at which the several resolvers operate. The two remaining boosters, in the $z'$ and $x''$ branches, must however act in satisfactory balance with the boosters of the basic route. We shall speak of such boosters as adjustable boosters. Each adjustable booster lies on a linkage between a first and second resolver, which we shall speak of as the "$a$" and "$b$" resolvers, respectively. This linkage forms an alternative to the basic route between resolvers "$a$" and "$b$." It is always the shortest route, since the basic route passes through at least one intermediate resolver in going from "$a$" to "$b$." What is required of each of the adjustable boosters is that it gives the same gain in voltage level between its "$a$" and "$b$" resolvers as will be found in the whole of the longer basic route between these resolvers.

The test is accomplished as follows:

1. All resolvers preceding the "$a$" resolver should be so set that there is a single non-zero voltage input to the "$a$" resolver. (In testing the $x''$ booster the "$a$" resolver is the second in the system. In accordance with this direction the angular input of the first resolver may be set at $\alpha=0$.)

2. The angular input of the "$a$" resolver should be so set that it gives voltage outputs of equal magnitude. (In testing the $x''$ booster, set the angular input of the second resolver at $-P=-45°$.)

3. Set the angular inputs of intermediate resolvers so that the basic route to the "$b$" resolver is available to one of the voltage outputs from the "$a$" resolver. (In testing the $x''$ booster, set the angular input of the third resolver at $-R=-90°$.) If the gains and phase shifts of the basic and alternative routes from the "$a$" resolver to the "$b$" resolver are equal, the "$b$" resolver should now be receiving equal voltage inputs in the same phase.

4. Set the angular input to the "$b$" resolver so that one of the voltage outputs will consist of equal fractions of the two voltage inputs combined in opposite phase. (In testing the $x''$ booster, set the angular input of the fourth resolver at $\alpha'=-45°$.) This voltage output will then vanish if the two inputs are equal and in the same phase.

5. A voltage testing device may be applied to the proper output terminal of the "$b$" resolver, or all succeeding resolvers may be so set as to provide a path for this voltage to a testing device at the end of the basic route through the device.

The adjustable booster under test should then be adjusted until the voltage at the test equipment 35 vanishes. This adjustment can be carried out without regard for the gain or phase shift existing in any other booster, all of these lying outside the electrical paths involved in the test or serving only to transmit voltage for which gain and phase shift are unimportant.

The test and adjustment procedure for the deck tilt corrector may be outlined as follows. The test voltage appears at the $x^{IV}$ terminals, and in each case the indicated booster is to be adjusted to give zero test voltage.

|  | I | II |
|---|---|---|
| Set— |  |  |
| $\alpha$ | 45° | 0° |
| P | 90° | 45° |
| R | −45° | 90° |
| $\alpha'$ | 90° | −45° |
| Adjust booster | $z'$ | $x''$ |

No other booster need be adjusted. In detailed design of the system, provision should be made for the quick and accurate setting of the angular inputs of the several resolvers to the values indicated above.

For the two axis computer of Fig. 3 and the level-cross level converter of Fig. 5 test procedures may be outlined as follows.

*Level-cross level converter*

[Test voltage appears at $y^V$ terminals.]

|  | I | II | III |
|---|---|---|---|
| Set— |  |  |  |
| P | −45° | 0° | 90° |
| R | 90° | 45° | 0° |
| $\alpha'$ | −45° | 0° | −45° |
| Z | 0° | −45° | 90° |
| L | −90° | 0° | 45° |
| Adjust booster | $x'$ | $y''$ | $x'''$ |

*Two axis computer*

[Test voltage appears at $x^{VI}$ terminals.]

|  | I | II | III | IV |
|---|---|---|---|---|
| Set— |  |  |  |  |
| $\beta$ | 45° | 0° | 90° | 90° |
| $\alpha$ | 0° | 45° | 90° | 0° |
| P | −45° | 90° | −45° | 0° |
| R | 0° | 45° | 90° | 45° |
| $\alpha'$ | 90° | 0° | −45° | 90° |
| $\beta'$ | 90° | 90° | 0° | −45° |
| Adjust booster | $y'$ | $z''$ | $x'''$ | $y^{IV}$ |

It is a feature of the deck tilt corrector illustrated in Fig. 4 that it serves, with slight changes, for the solution of other problems of importance. As an example, we consider its use as a deck tilt corrector for a so-called line-of-sight stabilized system. Such a system maintains a horizontal beam or line of sight by rotation of a spinner in the deck plane, and elevation of the beam above the deck plane by rotation about an axis in the deck plane. This stabilization is usually performed by a controlling gyroscope, which can be designed to provide the value of the angle Z', the inclination to the vertical of the plane in which the beam is being elevated, measured about a horizontal axis. There are simultaneously known the value of L', the angle through which the beam has been rotated upward from the deck plane, and the train order $\alpha'$ of the spinner base. It is desired to know the true relative bearing $\alpha$ to which the beam has been brought. To accomplish this, let $\alpha'$ be the angular input to the first resolver of Fig. 4, L' and Z' the angular inputs to the second and third resolvers, respectively. The last resolver will then continually have its angular input brought to the value $-\alpha$ which it is desired to know, or the electrical outputs $x'''$ and $z'''$ can be used directly in the control of an indicator giving the values of $\alpha$.

Similar modifications permit use of this device with three-axis stabilized systems, in which a yoke turned through the train order angle $\alpha'$, is rotated about an axis in the deck plane through an angle Z (as previously defined) until the elevation axis, about which the beam, optical sight, etc. is to be elevated, becomes horizontal.

Elevation of this beam vertically above the deck plane through the angle L will then bring it into the horizontal plane. Let it be desired to compute the true relative bearing α of the beam or optical line of sight. We distinguish two cases.

(a) Values of the angles R and P are available. Let the voltage inputs to the first resolver be $x=0$, $z=1$, instead of the reverse. (This corresponds to choice of a reference vector in the z coordinate direction instead of the x coordinate direction.) Let the servo controlling the last resolver maintain at 0 the electrical output $z^{IV}$, instead of $x^{IV}$. Let the angular inputs to the first three resolvers be, respectively, $α'$, $-R$ and $-P$. Then the servo will maintain the angular input of the fourth resolver at the value $-α$ which it is desired to know.

(b) Values of the angles L and Z are available. The changes in electrical inputs and the voltage used to control the servo are as for (a). Let the angular inputs to the first three resolvers be, respectively, $-α'$, $-Z$, $-L$. Then the servo will maintain the angular input of the fourth resolver at the value α which it is desired to know.

This invention is not to be limited except insofar as necessitated by the prior art and the spirit of the appended claims.

I claim:

1. An electrical computer for determining the angular position of a line of sight from a given position to a target with respect to a moving reference plane from data representing the angular position of said line of sight and said reference plane with respect to a stabilized measurement plane comprising means for measuring the angular relationship between said moving reference plane and said stabilized plane, means for determining the angular position of a line of sight with respect to said stabilized plane, a source of electrical voltages, means responsive to said angular data to produce output voltages having phase angle displacements from voltage inputs from said source, and means responsive to said phase angle displacements to indicate the position of said target with respect to said moving reference plane.

2. An electrical computer for determining the angular position of a line of sight from a given position to a target with respect to a moving reference plane from measurements representing the angular position of said line of sight and said reference plane with respect to a stabilized measurement plane comprising, means for measuring the angular relationship between said moving reference plane and said stabilized plane, means for determining the angular position of a line of sight with respect to said stabilized plane, a source of electrical energy, means responsive to said angular measurements to produce output voltages displaced in phase by similar angular relationships from input voltages derived from said source, and means responsive to said phase angle displacements to indicate the position of said target with respect to said moving reference plane.

3. An electrical computer for determining the bearing and elevation of a line of sight to a target with respect to a movable reference plane from measurements corresponding to the bearing and elevation of said line of sight and the pitch and roll angle relationship of said reference plane with respect to a stabilized measurement plane comprising a phase shifter adapted to produce output voltages displaced from input voltages by phase angles corresponding to a plurality of mechanical rotational inputs, means for applying voltages to energize to said phase shifter, means for introducing to successive mechanical inputs rotation corresponding to measurements of bearing, elevation, pitch, and roll angles respectively, means responsive to said output voltages to introduce to additional mechanical inputs the rotation required to restore said output voltages to the same phase and amplitude possessed by said input voltages, and means connected to said last-named mechanical inputs for indicating said restoring rotation.

4. Apparatus as defined in claim 3 in which voltage amplifying means are included in said phase shifter to compensate for electrical losses occurring in said phase shifter.

5. Electrical apparatus for computing the angular position of a line of sight from a given position with respect to a moving reference plane from measurements corresponding to the angular position of said line of sight and said reference plane with respect to a stabilized measurement plane comprising means to produce a reference voltage adapted to represent said line of sight, a plurality of phase shifters divided into two groups, each phase shifter being a two-phase transformer having a rotatable secondary adapted to provide output voltages displaced in phase from input voltages by the amount of angular rotation applied to said secondary, means applying said reference voltage to the first of said groups, means for introducing to the phase shifters of said first group angular rotation corresponding respectively to said measurements whereby the output voltages of said first group are related to said reference voltage by phase angle displacements representing the angular position of said line of sight with respect to said reference plane, means for applying said output voltages as input voltages to said second group of phase shifters, mechanisms responsive to the output voltages of said second group to rotate the secondaries of said second group of phase shifters to make said second group's output voltage equal in phase and amplitude to said reference voltage, and means connected to said mechanisms to indicate the angular rotation of said secondaries of said second group.

6. Apparatus as defined in claim 5 in which voltage amplifying means are included in each of said phase shifters to compensate for electrical losses occurring in said phase shifters.

7. Electrical apparatus for computing the angular position of a line of sight with respect to a moving reference plane from measurements corresponding to the angular position of said line of sight and said reference plane with respect to a stabilized measurement plane comprising a source of phased electrical reference voltages, a plurality of phase shifters adapted to produce output voltages displaced from input voltages by a phase angle corresponding to a mechanical rotational input, means to apply input voltages to said phase shifters, means to rotate the mechanical input of the first of said phase shifters to shift the phase of the input voltage by an amount corresponding to said measured angle of bearing, means to rotate the mechanical input of the second of said phase shifters to shift the phase of the input voltages by an amount corresponding to said measured angle of elevation whereby the position of said line of sight with respect to said measurement plane is established in the phase relationships present in the output voltages of said first and second phase shifters, means to rotate the mechanical input of the third of said phase shifters corresponding to said measured angle of pitch, means to rotate the mechanical input of the fourth of said phase shifters corresponding to said measure angle of roll whereby the position of said line of sight with respect to said reference plane is established in the phase relationships of the combined output voltages of said first, second, third, and fourth phase shifters, means responsive to the output voltages of the fifth and sixth of said phase shifters to rotate the mechanical inputs of said fifth and sixth phase shifters by the angular rotation required to produce phase relationships in the output voltages of said fifth and sixth phase shifters identical to the phase relationships of the initial input voltages, and means connected to said mechanical inputs to indicate the angles of rotation.

8. Apparatus as defined in claim 7 in which voltage amplifying means are included in each of said phase shifters to compensate for electrical losses occurring in said phase shifters.

9. In calculating apparatus for transforming the coordinates of the angular position of a line in space relatively to the horizontal and vertical into coordinates relatively to an unstable surface, the combination of a plurality of mechanisms for determining the trigonometric functions of angle and linear inputs, a stable element, movable means responsive to relative movements between said element and surface in mutually perpendicular planes, means movable in accordance with the elevation angle of said line in the vertical plane, means movable in accordance with the bearing of said line in a horizontal plane, operative connections between each of said means and one of said mechanisms for adjusting the latter in accordance with the corresponding angle, electrical means on each of said mechanisms responsive to said adjustment for developing a corresponding electrical value, connections between successive mechanisms for supplying said corresponding electrical values as linear inputs from one to the other, and a pair of additional mechanisms actuated in accordance with outputs of said first-named mechanisms for determining angular values respectively equal to the elevation of said line in a plane perpendicular to said surface and the bearing of said line in a plane parallel to said surface.

10. In calculating apparatus for transforming the coordinates of the angular position of a line in space relatively to the horizontal and vertical into coordinates relatively to an unstable surface, the combination of a plurality of electromechanical mechanisms for determining the trigonometric functions of angle and linear inputs, means responsive to angular movements of said surface relatively to a fixed plane, means movable in accordance with the elevation angle of said line in the vertical plane, means movable in accordance with the bearing of said line in a horizontal plane, operative connections between each of said means and one of said mechanisms for adjusting the latter in accordance with the corresponding angle, electrical induction means in each mechanism for inducing a voltage having a magnitude according with said angular input, connections between successive mechanisms for supplying said induced voltages as linear inputs from one to the other, and a pair of additional electromechanical mechanisms actuated in accordance with voltage outputs of said first-named mechanisms for determining angular values respectively equal to the elevation of said line in a plane perpendicular to said surface and the bearing of said line in a plane parallel to said surface.

11. In calculating apparatus for transforming the coordinates of the angular position of a line in space relatively to the horizontal and vertical into coordinates relatively to an unstable surface, the combination of a plurality of mechanisms comprising inductively coupled stator and rotor windings for determining the trigonometric functions of angle and linear inputs, means responsive to angular movements of said surface relatively to a fixed plane, means movable in accordance with the elevation angle of said line in the vertical plane, means movable in accordance with the bearing of said line in a horizontal plane, operative connections between each of said means and the rotor of one of said mechanisms for adjusting the latter in accordance with the corresponding angle, connections between the rotor and the stator windings of successive mechanisms for supplying induced voltage linear inputs from one to the other, and a pair of additional mechanisms comprising inductively coupled stator and rotor windings actuated in accordance with the rotor voltage outputs of said first-named mechanisms for determining and indicating angular values respectively equal to the elevation of said line in a plane perpendicular to said surface and the bearing of said line in a plane parallel to said surface.

12. In a calculating apparatus for transforming the coordinates of the angular position of a line in space relatively to the horizontal and vertical into coordinates relatively to an unstable surface, the combination of means responsive to angular movements of said surface in mutually perpendicular planes relatively to a fixed plane, means movable in accordance with the elevation of and bearing of said line, a plurality of mechanisms comprising inductively-coupled stator and rotor windings respectively arranged in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operative connections between said second means and the rotor of said second mechanism for adjusting the same in accordance with the bearing of said line, connections between a rotor winding of said first and second mechanisms and stator windings of a third mechanism for energizing the same, and operative connections between the rotor of said third mechanism and said first means for adjusting the former in accordance with the angular movements of said surface in one of said mutually perpendicular planes for inducing in a rotor winding of said third mechanism a voltage equal to the product of triogonometric functions of elevation and bearing angles of said line in respective planes perpendicular and parallel to said surface.

13. In a calculating apparatus for transforming the coordinates of the angular position of a line in space relative to the horizontal and vertical into coordinates relatively to an unstable surface, the combination of means responsive to angular pitching movements of said surface, means movable in accordance with the elevation and bearing of said line, a plurality of mechanisms comprising inductively-coupled stator and rotor windings respectively connected in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operative connections between said second means and the rotor of said second mechanism for adjusting the same in accordance with the bearing of said line, connections between a rotor winding of said first and second mechanisms and stator windings of a third mechanism for energizing the same, and operative connections between the rotor of said third mechanism and said first means for adjusting the former in accordance with the angular pitching movements of said surface for inducing in a rotor winding of said third mechanism a voltage equal to the product of trigonometric functions of elevation and bearing angles of said line in respective planes perpendicular and parallel to said surface.

14. In a calculating apparatus for transforming the coordinates of the angular position of a line in space relatively to the horizontal and vertical into coordinates relatively to an unstable surface, the combination of means responsive to angular movements of said surface in mutually perpendicular planes relatively to a fixed plane, means movable in accordance with the elevation of and bearing of said line, a plurality of mechanisms comprising inductively-coupled stator and rotor windings respectively arranged in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operative connections between said second means and the rotor of said second mechanism for adjusting the same in accordance with the bearing of said line, connections between a rotor winding of said first and second mechanisms and stator windings of a third mechanism for energizing the same, and operative connections between the rotor of said third mechanism and said first means for adjusting the former in accordance with the angular movements of said surface in one of said mutually perpendicular planes, several connections between a rotor winding of said second and third mechanisms and stator windings of a fourth mechanism for energizing the same, and operative connections between the rotor of said fourth mechanism and said first means for adjusting the former in accordance with the angular movements of said surface in the other of said mutually perpendicular planes for inducing in a rotor winding of said fourth mechanism a voltage equal to the product of trigonometric functions of elevation and bearing angles of said line in respective planes perpendicular and parallel to said surface.

15. In a calculating apparatus for transforming the coordinates of the angular position of a line in space relative to the horizontal and vertical into coordinates relatively to an unstable surface, the combination of means responsive to angular movements of said surface in mutually perpendicular planes relatively to a fixed plane, means adjustable in accordance with the elevation of and bearing of said line, a plurality of mechanisms comprising inductively-coupled stator and rotor windings respectively arranged in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operative connections between said second means and the rotor of said second mechanism for adjusting the same in accordance with the bearing of said line, connections between a rotor winding of said first and second mechanisms and stator windings of a third mechanism for energizing the same, and operative connections between the rotor of said third mechanism and said first means for adjusting the former in accordance with the angular movements of said surface in one of said mutually perpendicular planes, connections between a rotor winding of said second and third mechanisms and stator windings of a fourth mechanism for energizing the same, and operative connections between the rotor of said fourth mechanism and said first means for adjusting the former in accordance with the angular movements of said surface in the other of said mutually perpendicular planes for inducing in the respective rotor windings separate voltages equal to the values $$\cos E'g \cdot \sin B'r \text{ and } \sin E'g$$

as defined in the annexed specification.

16. In a calculating apparatus for transforming the coordinates of the angular position of a line in space relative to the horizontal and vertical into coordinates relatively to an unstable surface, the combination of means responsive to angular movements of said surface in mutually perpendicular planes relatively to a fixed plane, means adjustable in accordance with the elevation of and bearing of said line, a plurality of mechanisms comprising inductively-coupled stator and rotor windings respectively arranged in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operative connections between said second means and the rotor of said second mechanism for adjusting the same in accordance with the bearing of said line, connections between a rotor winding of said first and second mechanisms and stator windings of a third mechanism for energizing the same, operative connections between the rotor of said third mechanism and said first means for adjusting the former in accordance with the angular movements of said surface in one of said mutually perpendicular planes, connections between a rotor winding of said second and third mechanisms and stator windings of a fourth mechanism for energizing the same, operative connections between the rotor of said fourth mechanism and said first means for adjusting the former in accordance with the angular movements of said surface in the other of said mutually perpendicular planes, connections between a rotor winding of said third and fourth mechanisms and stator windings of a fifth mechanism for energizing the same, a motor energized by the voltage induced in a rotor winding of said fifth mechanism, and operative connections between the rotor of said fifth mechanism and said motor, whereby said motor rotates said last-named rotor winding through a deenergizing angle equal to the angular relation of said line relatively to a plane fixed with respect to said surface.

17. In a calculating apparatus for transforming the coordinates of the angular position of a line in space relative to the horizontal and vertical into coordinates relatively to an unstable surface, the combination of means responsive to angular movements of said surface in mutually perpendicular planes relatively to a fixed plane, means adjustable in accordance with the elevation of and bearing of said line, a plurality of mechanisms comprising inductively-coupled stator and rotor windings respectively arranged in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operative connections between said second means and the rotor of said second mechanism for adjusting the same in accordance with the bearing of said line, connections between a rotor winding of said first and second mechanisms and stator windings of a third mechanism for energizing the same, operative connections between the rotor of said third mechanism and said first means for adjusting the former in accordance with the angular movements of said surface in one of said mutually perpendicular planes, connections between a rotor winding of said second and third mechanisms and stator windings of a fourth mechanism for energizing the same, operative connections between the rotor of said fourth mechanism and said first means for adjusting the former in accordance with the angular movements of said surface in the other of said mutually perpendicular planes, connections between a rotor winding of said third and fourth mechanisms and stator windings of a fifth mechanism for energizing the same, a motor energized by the voltage induced in a rotor winding of said fifth mechanism, operative connections between the rotor of said fifth mechanism and said motor, connections between a rotor winding of said fourth and fifth mechanisms and stator windings of a sixth mechanism, a second motor energized by the voltage induced in a rotor winding of said sixth mechanism, and operative connections between the rotor of said sixth mechanism and said second motor, whereby said second motor rotates said last-named rotor through a deenergizing angle equal to the angular relation of said line relatively to a plane fixed with respect to said surface.

18. In a calculating apparatus for transforming the coordinates of the angular position of a line in space relative to the horizontal and vertical into coordinates relatively to an unstable surface, the combination of means responsive to angular movements of said surface in mutually perpendicular planes relatively to a fixed plane, means adjustable in accordance with the elevation of and bearing of said line, a plurality of mechanisms comprising inductively-coupled stator and rotor windings respectively arranged in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operative connections between said second means and the rotor of said second mechanism for adjusting the same in accordance with the bearing of said line, connections between a rotor winding of said first and second mechanisms and stator windings of a third mechanism for energizing the same, operative connections between the rotor of said third mechanism and said first means for adjusting the former in accordance with the angular movements of said surface in one of said mutually perpendicular planes, connections between a rotor winding of said second and third mechanisms and stator windings of a fourth mechanism for energizing the same, operative connections between the rotor of said fourth mechanism and said first means for adjusting the former in accordance with the angular movements of said surface in the other of said mutually perpendicular planes, connections between a rotor winding of said third and fourth mechanisms and stator windings of a fifth mechanism for energizing the same, a motor energized by the voltage induced in a rotor winding of said fifth mechanism, connections between a rotor winding of said fourth and fifth mechanisms and stator windings of a sixth mechanism, a second motor energized by the voltage induced in a rotor winding of said sixth mechanism, and operative connections between the rotors of said fifth and sixth mechanisms and the corresponding first and second motors, whereby the motors rotate the corresponding rotors through deenergizing angles equal to the angular relation of said line in mutually perpendicular planes, one of which lies parallel to said surface.

19. Electrical computing apparatus for obtaining the relative bearing of a line in space relative to an unstable surface from the angular movements of pitch and roll of the unstable surface relative to a stabilized reference surface and the relative bearing of said line relative to said reference surface, comprising a plurality of mechanisms having inductively coupled stator and rotor windings for determining the trigonometric functions of angle and linear inputs, a source of alternating currents connected to energize a stator winding of one of said mechanisms, means for angularly adjusting the rotor of said one mechanism in accordance with said bearing of said line relative to said reference surface, connections between a rotor winding of said one mechanism and a stator winding of a second mechanism for energizing the same, means for angularly adjusting the rotor of said second mechanism in accordance with said angular movement of pitch, connections between a rotor winding of said first and second mechanisms and stator windings of a third mechanism for energizing the same, means for adjusting the rotor of said third mechanism in accordance with said angular movement of pitch, connections between a rotor winding of said second and third mechanisms and stator windings of a fourth mechanism for energizing the same, a motor energized by the voltage induced in a rotor winding of said fourth mechanism, and operative connections between the rotor of said fourth mechanism and said motor, whereby said motor rotates said rotor of said fourth mechanism through a deenergizing angle equal to the relative bearing of said line of space relative to said reference surface corrected for the angular relationship between said reference surface and said unstable surface measured as pitch and roll angles.

20. Electrical computing apparatus for obtaining the angular relationship of level and cross level of an unstable surface related by pitch and roll angles to a stabilized reference surface with respect to a vertical plane including a line in space having a known relative bearing measured relative to said reference surface, comprising, a plurality of mechanisms having inductively coupled stator and rotor windings, a source of alternating current for energizing a stator winding of one of said mechanisms, means adjusting the rotor of said one mechanism in accordance with said pitch angle, connections between a rotor winding of said one mechanism for energizing a stator winding of a second mechanism for energizing the same, means for adjusting the rotor of said second mechanism in accordance with the said angle of roll, connections between a rotor winding of said first and second mechanisms for energizing the stator windings of a third mechanism, means for adjusting the rotor of said third mechanism in accordance with the relative bearing angle of said line in said reference surface, connections between a rotor winding of said second and third mechanisms for energizing stator windings of a fourth mechanism, a motor energized by the voltage induced in a rotor winding of said fourth mechanism, connections between a rotor winding of said third and fourth mechanisms for energizing the stator windings of a fifth mechanism, a second motor energized by the voltage induced in a rotor winding of said fifth mechanism, and operative connections between the rotors of said fourth and fifth mechanisms, and the corresponding first and second motors whereby the motors rotate the corresponding rotors through deenergizing angles equivalent to the cross level and level angles respectively between the unstable and reference surfaces measured in the vertical plane including said line in space.

References Cited in the file of this patent

UNITED STATES PATENTS

| | | |
|---|---|---|
| 2,414,108 | Knowles | Jan. 14, 1947 |
| 2,428,800 | Holden | Oct. 14, 1947 |
| 2,432,504 | Boghosian | Dec. 6, 1947 |
| 2,486,781 | Gittens | Nov. 1, 1949 |
| 2,510,384 | Dehmel | June 6, 1950 |
| 2,553,529 | Dehmel | May 15, 1951 |
| 2,613,317 | Mozley | Oct. 7, 1952 |

FOREIGN PATENTS

| | | |
|---|---|---|
| 579,325 | Great Britain | July 31, 1946 |